United States Patent [19]

Le Roy et al.

[11] Patent Number: 4,723,285

[45] Date of Patent: Feb. 2, 1988

[54] METHODS OF BROADCASTING AND RECEIVING HIGH QUALITY SOUND PROGRAMS AND A RECEIVER DEVICE

[75] Inventors: Guy Le Roy, Kerwegan-Servel; Guy Onno, Gouzabas St Quay Perros, both of France

[73] Assignee: Compagnie Industrielles des Telecommunications Cit-Alcatel, Paris, France

[21] Appl. No.: 738,717

[22] Filed: May 29, 1985

[30] Foreign Application Priority Data

May 29, 1984 [FR] France .................. 84 08425

[51] Int. Cl.⁴ .............................................. H04H 5/00
[52] U.S. Cl. ...................... 381/2; 370/110.1; 358/144
[58] Field of Search ............. 370/110.1; 381/1, 2, 381/3; 358/143, 144

[56] References Cited

U.S. PATENT DOCUMENTS

| | | | |
|---|---|---|---|
| 4,437,183 | 3/1984 | Profet | 370/110.1 |
| 4,498,170 | 2/1985 | Noguchi et al. | 370/110.1 |
| 4,519,068 | 5/1985 | Krebs et al. | 370/110.1 |
| 4,667,320 | 5/1987 | Onno et al. | |

FOREIGN PATENT DOCUMENTS

| | | | |
|---|---|---|---|
| 0144770 | 6/1985 | European Pat. Off. | 358/86 |
| 59-15388 | 1/1984 | Japan | 358/86 |
| 59-15387 | 1/1984 | Japan | 358/86 |

OTHER PUBLICATIONS

"Optical Fiber Mutiservice Subscriber Connection System: SAFO", Jean-Luc Popovics, IEEE vol. COM-30, No. 9, Sep. 1982.
"An Electronic Broadband Switch", Onno et al., ISS '84 Florence, 7-11 May 1984.

Primary Examiner—Forester W. Isen
Attorney, Agent, or Firm—Sughrue, Mion, Zinn, Macpeak, and Seas

[57] ABSTRACT

A broadcast center delivers each program in digital form and assembles the digital signals of the programs to constitute a digital multiplex which is conveyed to reception points by radio links or by cables. A program is selected by searching for coinicidence between a user-specified number and a channel number in the digital multiplex. The receiver device comprises an input circuit (1), a synchronization word finding ciruict (2), a bit counter (4), a channel counter (5), a comparator (7), a keyboard (8), first (11) and second (10) registers, a parity check register (13), and a digital to analog converter (14).

5 Claims, 4 Drawing Figures

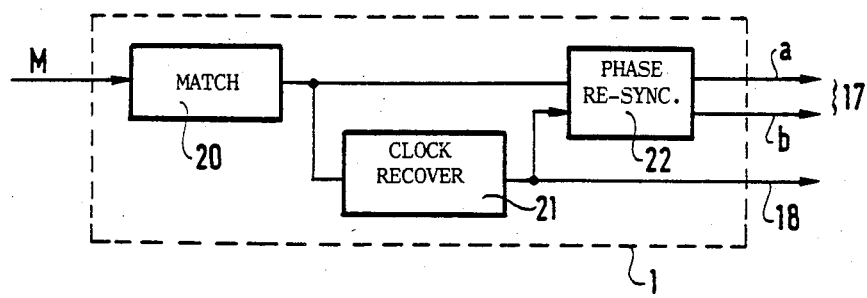
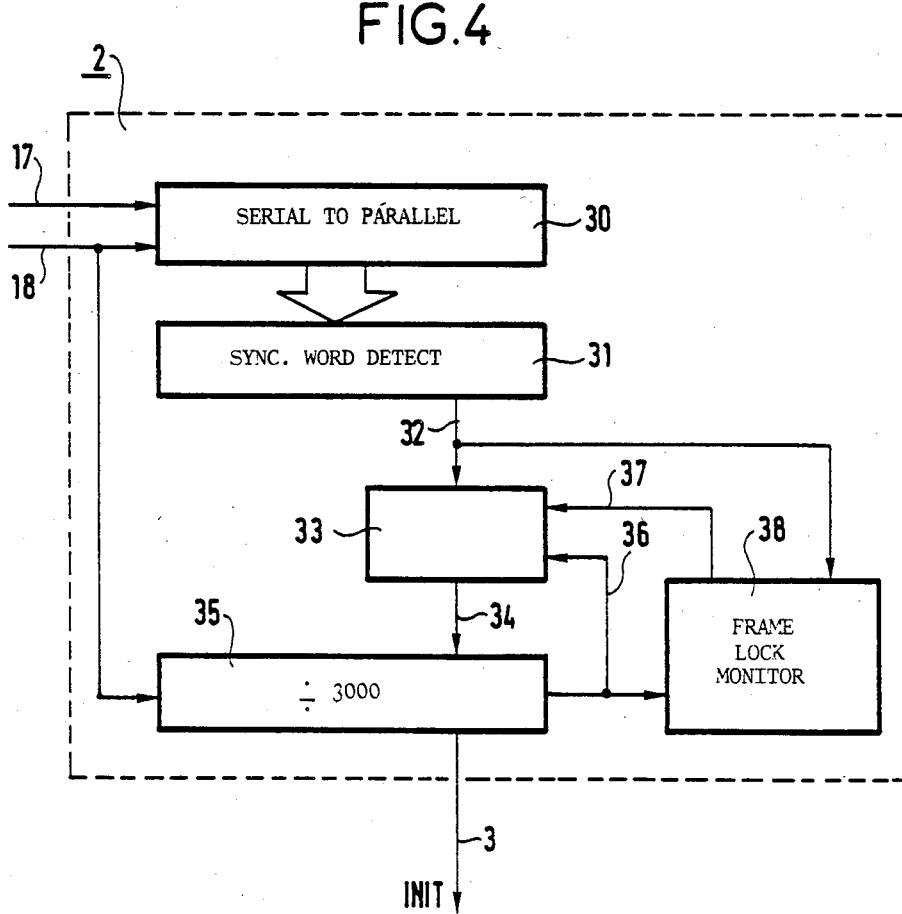

METHODS OF BROADCASTING AND RECEIVING HIGH QUALITY SOUND PROGRAMS AND A RECEIVER DEVICE

The invention relates to broadcasting high quality sound programs and to their reception.

BACKGROUND OF THE INVENTION

Sound programs are broadcast using radio waves by means of modulated analog carriers. On reception, a program is selected by tuning to the carrier frequency corresponding to the desired program. This type of broadcasting provides large capacity but it is not simple to implement.

Preferred implementations of the present invention enable high quality sound programs to be broadcast in a manner which has a large capacity similar to that of radio waves using analog modulated carriers, but providing in addition the quality which digital transmission is capable of attaining and, in addition, being simple to implement.

SUMMARY OF THE INVENTION

The present invention provides a method of broadcasting high quality sound programs from a transmitter center which delivers each program in digital form and which assembles the programs thus digitized into high data rate frames to constitute a digital multiplex which is conveyed to the receiver points, thus enabling networks to be used which have been developed for broadcasting video programs.

The invention also provides a multiplex digital transmission system for high-quality sound, operating at the same data rate as video program transmission multiplexes, and therefore suitable for being routed and switched through a cable network without requiring special equipment.

The invention also provides a method of receiving sound programs broadcast by the broadcasting method defined above, the receiving method consisting in selecting a program by seeking coincidence within each frame between a program number set by a user at a receiver point and the number of a channel in the digital multiplex.

The invention also provides a receiver device for receiving a digital multiplex and implementing the abovedefined method of reception.

BRIEF DESCRIPTION OF THE DRAWINGS

Implementations of the invention are described by way of example with reference to the accompanying drawings, in which:

FIG. 3 is a block diagram of an input circuit in FIG. 1; and

FIG. 4 is a block diagram of a circuit for finding a synchronization word as used in FIG. 1.

MORE DETAILED DESCRIPTION

It is well known to transform an analog signal into a digital signal by a pulse code modulation system (PCM) in which the analog signal is converted into a digital signal by sampling the analog signal, by quantizing the samples, and by encoding the result. It is also known to multiplex a plurality of digital signals and to assemble them into frames to constitute a digital multiplex.

In the method of broadcasting high-quality sound programs in accordance with the invention, a transmitter center delivers each high-quality sound program in digital form and assembles the digital signals of different programs into high data rate frames to constitute a digital mulitplex at the same data rate as a video program transmission multiplex, and the said digital multiplex is conveyed to receiver points.

The digital multiplex may be conveyed to the receiver points by radio waves or by cable links using coaxial cables or optical fibers.

At each receiver point, a receiver device enables a program to be selected by seeking coincidence between the number of the program selected by the user and the number of the channel in the digital multiplex frame over which the program is braodcast. The user selected number is advantageously displayed at the receiver point.

Figure 1:
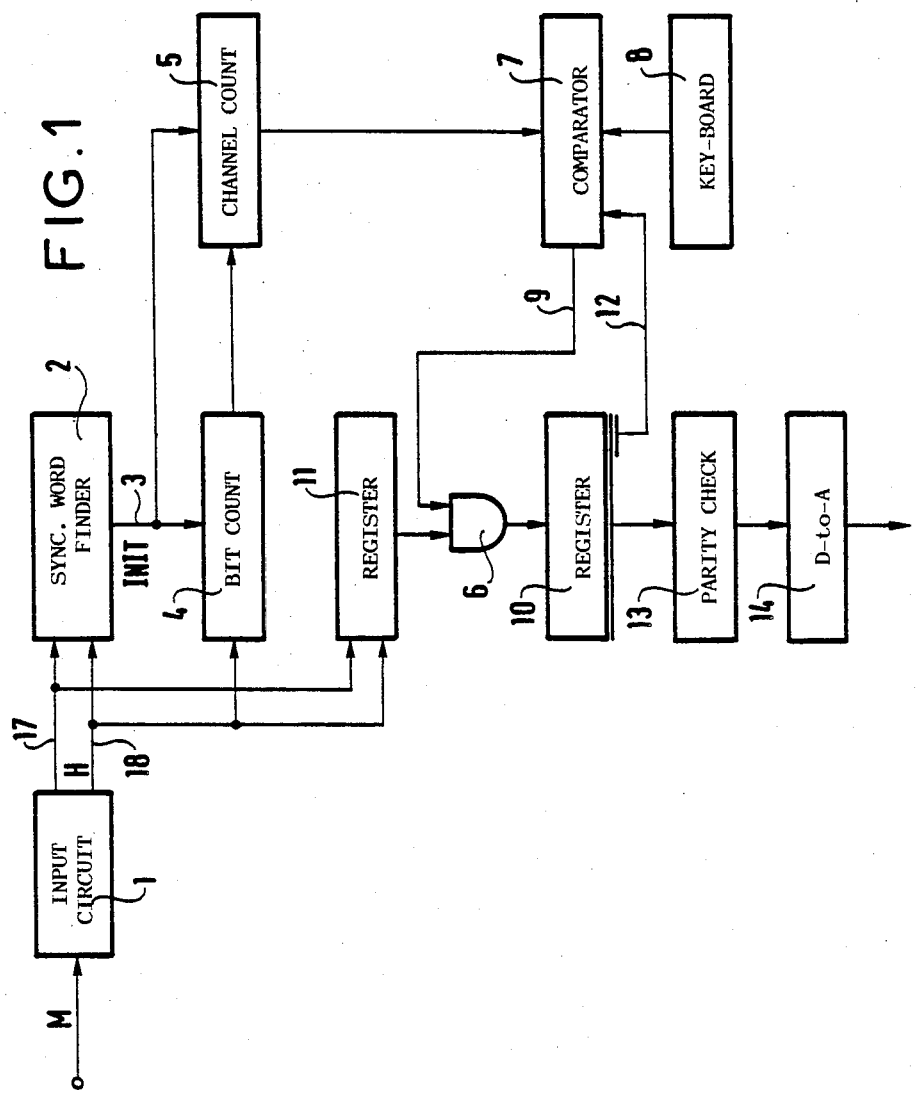
FIG. 1 is a block diagram of a receiver device in accordance with the invention.

FIG. 1 shows a receiver device in accordance with the invention. An input circuit 1 has its input connected to a multiplex link M coming from a high quality sound program broadcast center. By way of example, the multiplex link may have a data rate of 96 Mbit/s, with a sampling frequency of 32 kHz corresponding to an analog bandwidth of 15 kHz. The samples are digitized using a PCM (Pulse Code Modulation) system employing 16 bits per sample, thus including sufficient bits for one of the bits to be a parity check bit thus enabling badly transmitted words to be masked on reception, together with a program type indicator bit for mono or stereo, while still leaving 14 bits for the PCM code proper of the samples thereby guaranteeing high quality transmission. In another embodiment, two bits may be used for indicating the type of program which may be mono, stereo or quadraphonic, which still leaves 13 bits for PCM encoding of the samples. This may require the transmission quality to be improved by using a compression type of code.

These encoding parameters lead to a transmission data rate of 512 kbit/s for a mono program, to 1024 kbit/s for a stereo program, and to 2048 kbit/s for a quadraphonic program. Thus a nominal data rate of 96 Mbit/s for the digital multiplex (i.e. the same data rate as a video program transmission multiplex) gives a broadcast capacity of 186 mono programs, or 93 stereo programs, or 46 quadraphonic programs, or any combination of m mono programs+s stereo programs+q quadraphonic programs such that $m.512+s.1024+q.2048=95232$ kbit/s, thereby leaving a data rate of 768 kbit/s for synchronizing the digital multiplex, with synchronization being performed on a 24 bit work at a frequency of 32 kHz. Each frame of the digital multiplex thus comprises 186 16-bit channels for program transmission together with a synchronizing word of 24 bits. A mono program thus occupies a single channel in each frame, and a stereo occupies two successive channels in the same frame, i.e. an even numbered channel and the following odd numbered channel. Each frame may also be used for transmitting quadraphonic programs, in which case a quadraphonic program will occupy in a given frame four successive channels, with the first channel being attributed to a channel number which is divisible by 4.

Naturally the digital multiplex may have characteristics other than those that have been given above by way of example. Thus, a single digital multiplex may include mono, stereo, quadra or hexaphonic programs together with encoding modes for reducing data rates.

The input circuit 1 which is connected to the multiplex link M provides the well-known functions of recovering and regenerating a clock signal. It thus has a first output delivering binary data over a data link 17 and a second output delivering a clock signal H over a clock link 18. A conventional circuit 2 serves to find a synchronization word and is connected to receive both the data from the link 17 and the clock signal from the link 18, and it provides an output over an initializing link 3 in the form of an initialization signal INIT of duration equal to the 24 bits of the synchronization word. The initialization signal has a frequency of 32 kHz. The initialization signal is applied to a bit counter 4 and to a channel counter 5 both of which are forced to zero during the presence of the synchronization word. The bit counter 4 has its input connected to the clock link 18 and has its output connected to the channel counter 5. The bit counter 4 is a 4-bit counter which delivers pulses at a frequency of 6000 kHz. The channel 5 scans the 186 channels of the digital multiplex frame. A camparator 7 has one set of inputs connected to the output from the cannel counter 5 and a second set of inputs connected to the output from a keyboard 8 which enables the user to display a program number. The comparator 7 compares the number displayed by the user by the number delivered to the channel counter 5, and delivers a coincidence pulse via a line 9 to one input of an AND gate 6 having another input connected to the parallel output from a register 11, and having its output connected to the parallel input of a register 10.

The register 11 is a 16-bit register of the serial-parallel type and has a data input connected to the data link 17 and a clock input connected to the clock link 18. The register 10 is a 16-bit register of the parallel-parallel type and has its output connected to a parity check register 13. At the output from the register 10, one or both of the program type indicator bits (mono, stereo or quadraphonic) are directed via a line 12 to the comparator 7 in which each bit is applied to the input of a memory cell. The parity check register 13 is of the parallel-parallel type, it comprises 32 bits, and its output is connected to a digital to analog converter 14 which delivers the selected program in a form that is compatible with conventional amplifier devices.

The digital multiplex has 186 channels numbered 0 to 185; mono programs occupy any one of these channels, stereo programs occupy two channels, namely an even numbered channel and the following odd numbered channel, and quadraphonic programs occupy an even numbered channel and the three following channels.

If the user does not know which programs are being broadcast and in particular does not know about the constitution of the digital multiplex, but is simply looking for a pleasant program, the user causes his keyboard to display a program number and thus a digital channel number without knowing whether the corresponding program is mono, stereo or quadraphonic. The receiver device must nevertheless reproduce the entire selected program as broadcast. For example, supposing that the program indication is on 1 bit only and that the user selects channel 15; during the first received frame and while the channel counter 5 is in position 15 the comparator 7 delivers a coincidence pulse, this causes the sixteen bits of channel 15 to be transferred from the register 11 to the register 10 and the program type indicating bit is also transferred to the comparator 7 in which it is stored.

If the program is mono, the program type indication bit has the value 0 and during the following frame the comparator 7 delivers a coincidence pulse while it is receiving channel 15 from the channel counter 5, and so on during each frame.

However, if the program is in stereo, the program type indication bit has the value 1. This 1 value bit inhibits the counter from comparing the least significant bits of the number selected by the user and the number of the channel being delivered by the channel counter. Thus, during the next frame the comparator 7 delivers a coincidence pulse on reception of channel number 14 which is the even numbered channel preceding the odd numbered channel 15, thereby enabling the corresponding bits to be transferred from the register 11 into the register 10. The program type indication bit for the channel 14 is applied to the comparator 7, and since the program is stereo, this bit is likewise at logical value 1. The comparator 7 also delivers a coincidence pulse during the reception of channel number 15 which enables the corresponding bits to be transferred from the register 11 to the register 10. The user thus receives both channels 14 and 15 of a stereo program. Naturally, if channel 14 had been selected from the keyboard both channels 14 and 15 of the stereo program would likewise have been received. In other words, the value 1 bit which serves to indicate a stereo program is stored in the comparator 7 and subsequently inhibits comparison of the least significant bits of the number displayed on the keyboard and the channel number. Thus, when the channel counter delivers the number 14 the comparator delivers a coincidence pulse which enables the contents of the register 11 to be transferred to the register 10 so that the user receives both channels 14 and 15 in each frame. This ensures that the user can receive a stereo program without taking any special precautions since reception is automatically switched between mono and stereo depending on the type of program being broadcast.

If the type of program is indicated on two bits, a quadraphonic program occupies an even numbered channel and the three following channels within a given frame, i.e. two even numbered channels and two odd numbered channels. The program type indication is given, for example in each of the four channels, by two bits of value 1. As soon as the first coincidence is detected between the number selected by the user and the channel number delivered by the channel counter 5, both of these bits are transferred from the output of the register 10 to the comparator 7 where they prevent subsequent comparisons taking place on the two least significant bits of the number selected by the user and the channel numbers delivered by the counter 5. Since the comparison takes place only on the more significant bits thereafter, and since the comparator 7 delivers a coincidence signal as soon as a quadraphonic program channel number is received, a displayed number corresponding to any one of the four successive channels of the same quadraphonic program causes all four channels of the digital multiplex to be received. Assume, by way of example, that a quadraphonic program is being broadcast on channels 20, 21, 22 and 23. If the user selects channel 23 the comparator 7 will deliver a coincidence impulse as soon as a positive comparison occurs thereby enabling the contents of the register 11 to be transferred to the register 10 and the two program type indication bits to be stored in the comparator 7. Thereafter the comparator will deliver a coincidence pulse for each frame during each of channels 20, 21, 22 and 23 as received from the channel counter. If the user selects channel 21, as soon as the first positive comparison takes place, the comparator 7 delivers a coincidence pulse which enables the contents of the register 11 to be transferred to the register 10 and both program type indication bits to be stored in the comparator 7 which consequently delivers a coincidence pulse for each of the channels 22 and 23 of the frame in which coincidence first occurred and then for each of the channels 20, 21, 22 and 23 in the following frames. Naturally, the user could equally well have selected channel 20 or 22. The program type indication bits are stored on the first positive comparison and thereafter the comparator 7 delivers coincidence pulses each time the channel counter 5 delivers a channel number in the range 20 to 23.

The parity check register 13 is of a size suitable for quadraphonic programs. It performs a parity check on the 16 bits of a sample belonging to one channel. If the program is a stereo program or a quadraphonic program it performs successive checks on each 16-bit sample. The check consists in comparing the parity of the 16 received bits with the parity bit included in the 16 bits. If the parity is bad, the sample is assumed to be in error and is not forwarded.

Figure 2:
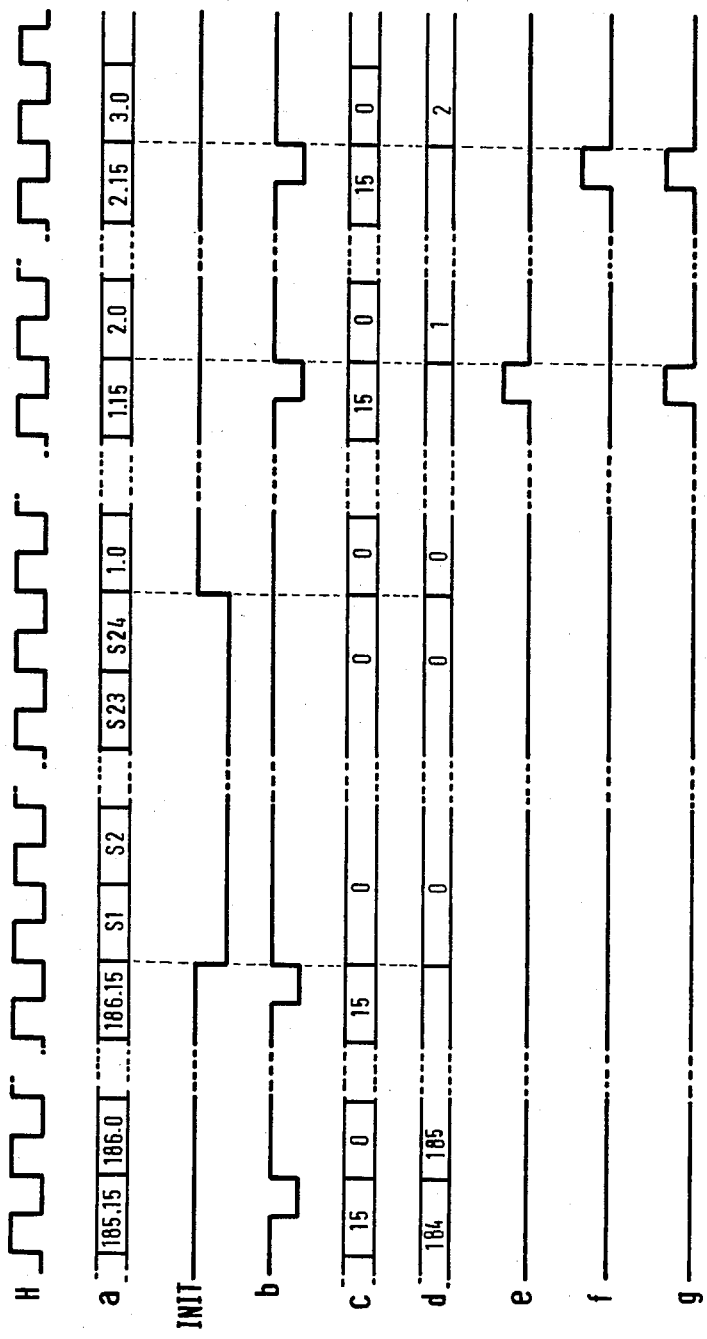
FIG. 2 is a waveform diagram of various signals in the FIG. 1 receiver device.

FIG. 2 is a waveform diagram showing the various signals in the receiver device.

H is the clock signal delivered by the input circuit 1;

a represents the digital multiplex in which the channel numbers are followed by a bit number, e.g. 185.15 is bit 15 of channel 185. 186.0 and 186.15 are bits 0 and 15 respectively of channel 186. The bits of the synchronization word are referenced S1, S2, ... S24;

INIT is the initialization signal delivered by the synchronization word finding circuit 2;

b is the signal delivered by the bit counter 4 to the channel counter 5;

c shows the state of the bit counter 4 as a function of time;

d shows the state of the channel counter as a function of time; and e, f and g show the coincidence pulse as delivered by the counter 7 on the line 9 for three different kinds of program selection:

e relates to the selection of a mono program in channel 0 of the digital multiplex;
    f relates to the selection of a mono program in channel 1 of the digital multiplex; and
    g indicates the case of a stereo program occupying channel 0 and 1 of the digital multiplex.

FIG. 3 shows, by way of example, the input circuit 1 of the receiver device of FIG. 1. In FIG. 3, 20 is a matching device having its input connected to the multiplex link M which may be a coaxial link for example, and which includes a fixed equalizer of known type for compensating inequalities of attenuation as a function of frequency. 21 is a clock rate recovery circuit of known type, and may be constituted, for example, on the basis of a passive bandpass filter such as a surface wave filter. 22 is a phase resynchronizing circuit such a D type bistable which delivers symmetrical signals over the data link 17 which is constituted by two wires a and b. The matching device 20 has its output connected to the phase resynchronizing circuit 22. The clock rate recovery circuit 21 has its input connected to the output from the matching circuit 20 and delivers the recovered clock signal H to the clock link 18. The recovered clock signal also controls the phase resynchronizing circuit 22.

FIG. 4 shows an example of the synchronization word finding circuit 2 of the FIG. 1 receiver device.

In FIG. 4, 30 is a series in and parallel out shift register having a capacity of 24 bits. It has inputs connected to the data link 17 and to the clock link 18. 31 is a synchronization word detection device which receives the 24 bits from the output of the register 30 and has its output connected by a wire 32 to a selection device 33 for selecting an imitation of the synchronization word. The device 33 also receives a loss of synchronization signal 37 and a signal indicating the theoretical position of the synchronization word on a wire 36. It supplies a preset signal to a counter 35 via a wire 34. The counter 35 divides by 3000 and receives the clock signal 18 at a clock input and provides the signal indicating the theoretical position of the synchronizing word on the wire 36 as well as the initialization signal INIT. 38 is a frame lock monitoring circuit.

The receiver device in accordance with the invention thus serves to select one program from a digital multiplex containing a plurality of programs transmitted from a transmitter center capable of retransmitting, for example, solely the programs from various radio broadcast stations. In this case the programs are generally known in advance by means of specialized publications which give the broadcast schedule for the forthcoming week and indicate the channel of the digital multiplex for each program together with an optional indication of whether it is a mono, a stereo or quadraphonic broadcast. A user wishing to listen to a particular program selects the corresponding channel on the keyboard. If the user does not know which programs are being broadcast, it is possible to select any program from the keyboard and if that program is unsatisfactory to select another. It is thus possible to scan through all channels of a given digital multiplex while looking for a channel that pleases. This method of proceeding is comparable to the method used by a listener tuning across a frequency band of a conventional radio receiver. As indicated during the description, the user does not need to know whether the selected program is mono, stereo or quadraphonic.

The broadcast center can also broadcast, if the digital multiplex is large enough, sound programs on request, or indeed it may broadcast only programs on request. The user then has to place a request with the broadcast center, e.g. by telephone or any other telecommunications means which then provides a key for authorizing access or decoding a program that may be encrypted together with the channel number on which the requested program is to be broadcast. If the program is stereo or quadraphonic, the user only needs to have the number of one of the channels, e.g. the even numbered channel, and the receiver device will receive and forward automatically all the channels to the listening means that are appropriate to the broadcast in question, as described above.

In the receiver shown in FIG. 1, the multiplex link M is directly connected to the broadcast center via a coaxial type of cable. If the cable is of the optical fiber type, the multiplex link M is connected at its output to a converter device (not shown) for converting optical digital signals into electrical digital signals. If the digital multiplex is conveyed by radio waves, the multiplex link M is connected to a receiver (not shown in FIG. 1).

The invention thus serves to convey sound programs of high quality in the form of a digital multiplex to receiver points, thereby enabling networks that were developed for broadcasting video programs to be used for broadcasting sound programs, without there being any need to add special equipment.

We claim:

1. A device for receiving high-quality sound programs, comprising:

an input circuit having its input connected to a multiplex link conveying said sound programs in digital form in the channels of a frame, and having its output connected to a data link and to a clock link over which the input circuit delivers a recovered clock signal;

a frame synchronizing circuit for searching for a frame synchronization word having its input connected to the input circuit by the data link and having an output connected to respective inputs of a bit counter and a channel counter via an initialization link over which the frame synchronizing circuit delivers an initialization signal (INIT);

the bit counter having an input connected to the clock link and having its output connected to the channel counter;

a first register of the series to parallel type having its input connected to the data link and having a control input connected to the clock link;

a comparator receiving at a first input thereof an output from said channel counter;

an AND gate having one input connected to the parallel output from the first register and having another input connected to the output from the comparator;

a second register of the parallel to parallel type having its input connected to the output from the AND gate and having its output connected to a parity clock register which has its own output connected to a digital to analog converter, the second register having its output connected to a second input of the comparator via a line which conveys two bits for indicating program type, the comparator storing the said program type indication bits.

2. A method of broadcasting audio programs to a plurality of reception points from a broadcast center, said method comprising the following steps:

digitizing each of said audio programs in a pulse code modulation form, said digitizing step including the step of taking a plurality of samples of each of said audio programs, and quantizing and encoding said samples such that the pulse code modulated signals employ several bits for each of said samples, said digitizing step producing a plurality of digital signals corresponding to respective ones of said analog audio programs;

assembling said digital signals of said analog audio programs into a plurality of frames having a high data rate so as to constitute a digital multiplex which operates at the same data rate as a video program transmission digital multiplex, each of said frames comprising a plurality of channels, each of said programs respectively occupying at least one of said channels, wherein each of said channels includes at least one bit indicative of the type of program represented therein; and delivering the audio programs in digital form to said reception points in accordance with said digitizing and assembling steps.

3. A broadcasting method according to claim 2, wherein said delivering step comprises the step of delivering said digitized audio programs over digital video program transmission and switching equipment.

4. A broadcasting method according to claim 2, wherein said at least one bit indicates whether each of said channels includes a monophonic program, a stereophonic program, or a quadraphonic program, wherein a monophonic program occupies one channel, a stereophonic program occupies an even-numbered channel and an immediately-following odd-numbered channel, and a quadraphonic program occupies an even-numbered channel and three immediately-following channels, said at least one bit including two bits to indicate a quadraphonic program.

5. A method of receiving digitized audio programs, wherein said digitized audio programs are contained in a digital multiplex in a plurality of high data rate frames, such that said digital multiplex operates at the same data rate as a digital video program transmission multiplex, each of said frames containing a plurality of digitized ones of said audio programs, each of said digitized audio programs containing at least one bit indicating whether the program is broadcast in monophonic, stereophonic or quadraphonic form, said method comprising the following steps:

selecting a program number indicative of a program to be received;

comparing said program number with a corresponding channel number in said digital multiplex;

examining said bits indicative of the type of program contained in corresponding channel; and selecting the appropriate channels in accordance with said examination step, wherein said step of selecting the appropriate channels comprises the following steps:

if a monophonic program is selected, selecting the program selected in accordance with said step of selecting said program number;

if the program selected is a stereophonic program, and the program number is an odd-numbered program, selecting the immediately-preceding even-numbered program;

if the program selected is a stereophonic program, and the program selected in accordance with said step of selecting said program number is an even-numbered program, selecting the program selected in accordance with said step of selecting said program number;

if the program selected is a quadraphonic program, examining two of said bits to determine the correct channel to be selected.

* * * * *